Patented Mar. 20, 1951

2,545,683

UNITED STATES PATENT OFFICE 2,545,683

POLYVINYL ACETAL RESINS

Herman S. Bloch, Chicago, Ill., assignor to Universal Oil Products Company, Chicago, Ill., a corporation of Delaware No Drawing. Application May 24, 1947, Serial No. 750,361

9 Claims. (Cl. 260—73)

The present invention relates to the production of resinous condensation products broadly characterized as polyvinyl acetal compounds. More specifically, the invention concerns a method for producing said resins which comprises reacting a Schiff base, hereinafter more specifically described, with a polyvinyl alcohol or a partially hydrolyzed ester thereof. The primary object of the present invention, therefore, is to provide a process for the production of said resinous condensation products wherein the above general classes of reactants are utilized.

It is another object of the invention to produce resin-like condensation products of a polyvinyl alcohol or an ester thereof which is at least partially hydrolyzed and a Schiff base of an aldehyde or ketone, said resinous products being useful as moldable resins per se or as components of various compositions, as for example in the formulation of paints, varnishes, lacquers, adhesives, and the like.

Still another object of the invention is to prepare resinous products having either thermoplastic or thermosetting properties, depending upon the character of the reactants utilized in the preparation thereof and upon the conditions selected for effecting the condensation reaction involved in the formation of the present acetal type of compounds.

Broadly, the invention comprises reacting at least a partially hydrolyzed ester of a polyvinyl alcohol with a Schiff base formed from a carbonyl compound selected from the group consisting of the saturated and unsaturated aliphatic, alicyclic, and aromatic aldehydes and ketones under reaction conditions which cause the condensation of the reactants and the liberation of a nitrogen-containing base as a by-product of said condensation reaction. Although ketimines are not ordinarily considered to be Schiff bases, a Schiff base is herein defined as an N-substituted imine derived from a primary amine and an aldehyde or ketone.

In accordance with one specific embodiment thereof, the invention comprises reacting polyvinyl alcohol with from about one-tenth to about one molecular proportion of a Schiff base, wherein said molecular proportion is based upon monomeric vinyl alcohol, at a temperature of from about 10° to about 150° C. in the presence of a mineral acid as catalyst for the condensation reaction and a solvent which mutually dissolves said reactants, thereafter removing said solvent and said catalyst and recovering from the reaction mixture the resultant polyvinyl acetal condensation product as the resin of this invention.

Another specific embodiment of the invention relates to a process which comprises reacting polyvinyl acetate and the Schiff base prepared by the condensation of a primary amine with an aromatic ketone, the reaction being effected in the presence of a sufficient quantity of hydrochloric acid to form the hydrochloride of said Schiff base at a temperature of from about 30° to about 100° C. and for a period of time sufficient to not only hydrolyze the polyvinyl acetate but also to effect the condensation of the reactants and form thereby an acetal type of linkage and thereafter isolating from the reaction mixture the condensation product of the acetalation reaction.

Other embodiments relating to specific reactants and to means for conducting the reaction will be hereinafter described in greater detail.

The reaction mechanism involved in the formation of the present resinous condensation product is believed to be essentially an acetalation reaction between a polyvinyl alcohol and a Schiff base, illustrated, for example, by the following general equation wherein the polyvinyl alcohol reacting component is represented by a portion of the polyvinyl chain present in the polymer.

(1)
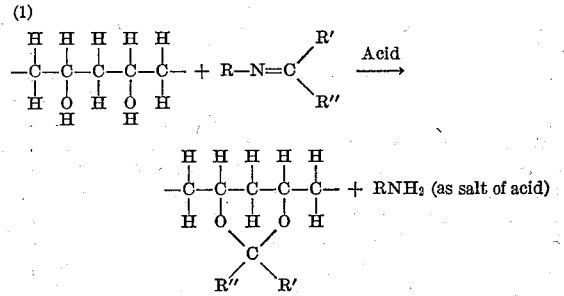

R, R' and R" of the above Schiff base reactant may be selected from the group comprising hydrogen, alkyl, alkenyl, or a heterocyclic radical, provided that R is not hydrogen and that if R' is hydrogen, R" is a radical other than hydrogen selected from the above group. The polyvinyl reactant, represented by a segment of the polyvinyl chain in the above formula, is usually a polymer of from about 5,000 to about 100,000 molecular weight. Although some of the hydroxyl groups attached to individual carbon atoms of the polyvinyl chain may be replaced by ester groups, it is apparent, on the basis of the reaction mechanism involved in the formation of the present acetal linkage, that at least a portion of the hydroxyl groups must be free hydroxyl groups (that is, not esterified), since acetal formation is dependent upon the condensation between a free hydroxyl group and the doubly bound carbon atom of the Schiff base.

It is to be noted that R is not a hydrogen atom; the unsubstituted imines of aldehydes and ketones generally do not exist in the monomeric state, but are normally found as polymers. These polymers may, however, be used in the present process in place of Schiff bases. The ammonia or primary amine salt formed as a by-product during acetalation may be recovered from the reaction products and recycled for the formation of additional Schiff base or ammonia condensation products.

The reactant herein referred to as a polyvinyl alcohol or an ester thereof at least partially hydrolyzed, is a polymer of polyvinyl alcohol or its partial ester having a molecular weight of at least 5,000, preferably of from about 20,000 to about 100,000. Said partially hydrolyzed ester may be represented as a polyvinyl alcohol in which a portion of the hydroxyl groups are esterified by an organic acid radical. A completely esterified organic ester of polyvinyl alcohol such as the acetate, propionate, butyrate, sebacate, benzoate, phthalate, etc. may also be utilized as the polyvinyl reactant in the present condensation reaction when reaction conditions and a hydrolyzing agent are selected so as to effect at least a partial hydrolysis of the polyvinyl ester.

The hydrolyzing agent present in the reaction mixture when the latter completely esterified polyvinyl alcohol reactant is employed is usually a strong mineral acid which not only catalyzes the condensation reaction or acetal formation but also concomitantly hydrolyzes a portion of the ester linkages to provide free alcohol groups essential to the acetal-forming reaction.

When desired, partial or complete hydrolysis of the polyvinyl alcohol ester may be effected prior to charging the reactants into the process and for this purpose it is preferred that at least 25% and higher, up to complete hydrolysis, of the ester linkage be effected, since in general, the properties of the product are directly dependent upon the extent of hydrolysis obtained either before or during the condensation reaction. It has been noted, for example, that by increasing the percent of hydrolysis, the softening point, tensile strength, hardness etc. of the product is increased, whereas the solubility of the product in various organic solvents and its flexibility is generally lowered. The above properties and others, such as the impact strength are also dependent upon other factors involved in the reaction, such as the type of Schiff base utilized in the reaction, the molecular weight of the polyvinyl alcohol or its ester and the degree of cross-linking or bridging obtained during the condensation or acetal forming reaction.

In the production of the present resinous condensation products, it has been noted that when condensation is effected under certain conditions of operation, as hereinafter defined, the resinous product acquires the properties of the thermosetting type of resin and it is believed that the result is dependent upon the formation of the so-called "bridged" or "cross-linking" obtained between individual polyvinyl alcohol or partial ester molecules. The reaction mechanism for the formation of the present product, as proposed in Equation 1 above, wherein the following type of linkage is established, (A) 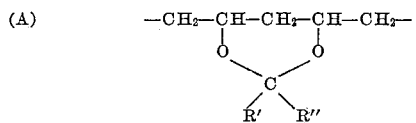

represents but one type of acetal linkage obtained in the condensation reaction; however, under conditions of reaction in which cross-linking may be obtained type A acetal linkage is substituted at least partially by the bridged type of linkage indicated by the following formula:

(B) 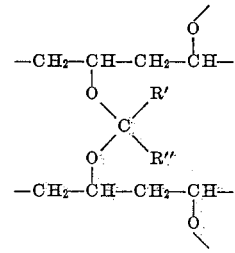

Formula A above is an acetal structure formed by the condensation of the Schiff base between the adjacent free hydroxyl groups on the same polyvinyl chain of carbon atoms and is the type of linkage usually formed. Type A linkage ordinarily gives rise to resins having thermoplastic properties and relatively low melting points. Formula B represents the bridged type acetal linkage obtained by the condensation of the Schiff base with free hydroxyl groups on different polyvinyl chains and is apparently formed to a minor extent under most conditions of acetalation. Cross-linkage may be favored, however, by the use of a relatively slightly hydrolyzed polyvinyl ester. If the degree of hydrolysis is small, the probability of the existence of free hydroxyl groups in the positions required to make product A is reduced, and product B is more likely. The latter type B linkage is believed to be involved in the formation of thermosetting resinous products and is not necessarily limited to cross-linking between merely two molecules of polyvinyl reactant but may involve a number of individual polyvinyl alcohol chain molecules containing a multiplicity of hydroxyl groups resulting in the formation of large resin molecules having high melting points and relatively poor solubility in organic solvents.

By varying one or more of the factors which determine the course of reaction, that is, the reaction temperature, the degree of hydrolysis of the polyvinyl alcohol ester, the structure of the Schiff base, the viscosity (that is, the molecular weight) of the polyvinyl reactant and the presence or absence of a catalyst in the reaction mixture, it is possible to obtain resinous products having a wide variation in properties ranging from thermoplastic to thermosetting types, from hard to soft resins, from low melting to high melting products. The physical properties of the resins may be further modified by utilizing reactants containing radicals other than the groups which enter directly into the acetal-forming reaction. Thus, the aldehyde or ketone from which the Schiff base is derived may contain olefinic unsaturation, or the carbon atoms comprising the Schiff base reactant may be substituted by radicals other than hydrogen atoms, such as halogen atoms etc. which determine the melting point, solubility and other properties of the resinous product.

The Schiff base reactant which when condensed with the polyvinyl reactant hereinabove specified at condensation reaction conditions forms the present resinous product may be selected from any of the large number of compounds broadly characterized and commonly known as Schiff bases. These compounds may be prepared by well known processes, as for example, by reacting a carbonyl compound selected from the aldehydes and ketones with a primary amine. One process for the production of a Schiff base involves passing a mixture of the carbonyl compound and the nitrogen-containing base, usually in the vapor state over a suitable catalytic material, such as a composite of the oxides of copper, chromium and barium at an elevated temperature of from about 100° to about 250° C. at pressures of from about 10 to about 20 atmospheres. Other methods are also known for the production of the Schiff base such as those involving the use of alkaline catalysts or catalysts like zinc chloride, and it is not intended to limit the present process to the particular method outlined above.

Of the nitrogen-containing bases, which may be employed for the production of the Schiff base it is preferred to use a suitable primary amine such as an alkyl, alkenyl, cycloalkyl, or aromatic amine represented respectively by methylamine, butenylamine, cyclohexylamine, and aniline as typical examples thereof. It has already been mentioned that aldehyde-ammonia or ketone-ammonia condensation products may also be used. The carbonyl reactant may be an aldehyde or ketone which may be aliphatic, cycloaliphatic or aromatic of either saturated or unsaturated structure. Suitable ketones include such as acetophenone, butyrophenone, benethylketone, diethylketone, etc., cyclic saturated ketones such as methylcyclohexylketone, cyclic members wherein the carbonyl group is part of the ring, such as cyclohexanone, unsaturated ketones, such as vinylmethylketone, ethylideneacetone, mesityl oxide, phorone, etc., aryl ketones such as acetophenone, butyrophenone, benzophenone, etc. and alkenyl arylketones such as propenylphenylketone and homologs of the above classes. Typical aldehydes include such compounds as acetaldehyde, crotonaldehyde, benzaldehyde, and others. The homologs of formaldehyde are particularly useful, especially those having up to about 5 carbon atoms per molecule, since the latter form polyvinyl acetals having useful solubility properties and have a relatively high resistance to weathering and stability to light. The aldehydes and ketones may further be employed in admixture with each other or with other members of the same group. As heretofore indicated, the carbonyl reactant may also contain diverse radicals attached to other carbon atoms in the structure of the compound to thereby introduce various modifications in the properties of the ultimate acetal resin. Such other radicals may be one or more of the following group: halogen, nitro, amino, alkoxy, acyloxy, carboxyamide, carboxylalkyl, or sulfonic acid ester radicals which, although they do not enter into the condensation reaction directly with the polyvinyl reactant, nevertheless affect the melting point, solubility and other characteristics of the resin by introducing individual properties associated with the above radicals. In general, when utilizing a Schiff base derived from an unsaturated carbonyl compound, as for example, the ketones and aldehydes wherein the carbonyl group is attached to an alkenyl residue, the products tend to have somewhat different properties than the product prepared from the corresponding saturated carbonyl reactant containing the same number of carbon atoms. As a rule, the products derived from the unsaturated series of reactants tend to have higher melting points due, it is believed, to incidental polymerization effects obtained between the double bonds of said reactants. The higher molecular weight carbonyl reactants also tend to form resins having greater flexibility and resilience as well as lower melting points, although these properties do not depend exclusively upon the molecular weight of the reactants involved.

The condensation reaction of this invention, whereby a resinous product containing acetal linkages is formed, may be conducted either in the presence of certain catalytic agents or in their absence, and generally the question of whether a catalyst is to be used or not will depend upon the readiness with which the reactants tend to form the acetal linkage in its absence. The catalyst may be described as an acidic substance which may be selected from the organic acids or from an inorganic mineral acid. When utilized, a mineral acid such as dilute hydrochloric or sulfuric acid is preferred and is added directly to the reaction mixture in sufficient quantity and/or concentration to result in a slightly acidic reaction mixture. When an organic acid is employed, such as carboxylic acid (acetic, propionic, chloroacetic, etc.) or a sulfonic acid (ethanesulfonic acid, toluenesulfonic acid, etc.), the amount of acid catalyst added to the reaction mixture is sufficient to more than neutralize the Schiff base charged to the reaction; on the other hand, when utilizing mineral acids, such as hydrochloric acid, the hydrochloride salt of the Schiff base is generally sufficiently acidic to catalyze the reaction and a lesser amount of the acid need be used. Anhydrous hydrogen chloride in an anhydrous reaction system is especially effective, permitting the complete utilization of the Schiff base if a slight excess of the acid is present. The catalyst may be subsequently removed from the resinous product by contacting the mixture with a solvent which has a selective solubility for the catalyst, such as water containing an alkali hydroxide, or, alternatively, the resin may be dissolved from the catalyst in a solvent which selectively dissolves the resin, such as benzene, methyl alcohol, etc. When a completely esterified polyvinyl alcohol is charged into the reaction mixture, the acid catalyst serves as a hydrolyzing reagent as well as a condensation catalyst and under such conditions a strong mineral acid catalyst is required in order to obtain the condensation reaction by the simultaneous partial hydrolysis of the ester and acetalation. In such a procedure, the polyvinyl ester, the acid catalyst, and the Schiff base are combined prior to the reaction and heated for a length of time such that the desired degree of hydrolysis and acetalation are obtained in the same reaction. The proportion of reactants in the reaction mixture may be varied to give a product containing any desired proportion of ester groups, free hydroxy groups and acetalated hydroxy groups, the properties of the resultant resin varying in accordance with the number of said groups.

Under certain conditions of reaction and when utilizing certain types of reactants, it is desirable to conduct the reaction in the presence of a solvent for one or more of the reactants. The solvent may be selected from the aliphatic alcohols such as methyl, ethyl, propyl, butyl, etc. alcohols, ethers, or hydrocarbons such as benzene, toluene, butane, hexane, etc. The solvent tends to modify the rate of reaction and the type of product obtained from the condensation reaction, the products, in general, being lighter in color than when the solvent is absent.

The resin-forming reaction of the present invention may generally be initiated at relatively low temperatures, as for example, temperatures within the range of from about 30° to about 90° C. although in the case of some reactants, the temperature may be as low as about 10° C. and as high as about 150° C. Superatmospheric pressures need not be utilized except in the case of the low boiling reactants and solvents, in which case it is desirable to utilize high pressures up to about 20 atmospheres to maintain the vaporizable charge in liquid phase during the reaction. The proportion of Schiff base in the reaction mixture determines the amount of acetal formation and the latter may be varied from a very small amount to essentially complete acetalation. It is generally preferred to utilize a molecular ratio of polyvinyl alcohol to Schiff base of from about 1 to about 10, where the molecular proportion of polyvinyl alcohol is based upon the number of monomeric vinyl alcohol units in the polymer. As indicated previously, the amount of cross-linking between the reactants depends in part upon the number of free hydroxyl groups of the polyvinyl alcohol reactant involved in the reaction, which in turn is determined by the degree of esterification and/or hydrolysis of the polyvinyl ester charged to the reaction. For the production of high melting point resins, it is desirable to have sufficient Schiff base present in the reaction mixture to condense with a large proportion or all of the polyvinyl hydroxyl groups.

In a typical preparation of the present resinous product, the polyvinyl reactant, such as completely esterified polyvinyl acetate, is mixed with from about one-tenth to about 10 weight proportions of a Schiff base such as the base prepared by the condensation of a ketone with a primary amine, and the resultant mixture stirred with about one-tenth percent by weight of the reaction mixture of concentrated sulfuric acid. The mixture is then dissolved in from about 1 to about 10 volume proportions of a suitable alcohol solvent, such as methyl alcohol and heated in a closed system to the desired reaction temperature. Following the reaction period of from about 10 minutes to about 2 hours, the contents of the reactor are cooled, diluted with water and the precipitated polyvinyl acetal resin washed and dried. The resulting aqueous solution may be fractionated to recover the solvent and subsequently treated with an alkali to liberate the amine from the salt formed by reaction of the acid catalyst with the by-product amine from the condensation reaction. The recovered amine may then be recycled to the Schiff base forming reaction for reuse therein.

The polyvinyl acetal resins formed in the present invention have a wide field of utility especially in the formation of lacquers, adhesives, coating compositions, such as paints and varnishes, molding compositions, etc. One of the outstanding uses of the resins is in the preparation of coating compositions, such as lacquers, paints and varnishes where the resin is dissolved in a suitable solvent to form a lacquer or in a drying oil and pigment to form a paint composition. The thermoplastic type of resin produced by the present process may be molded into various articles in a hot molding apparatus, the resin usually providing a transparent or translucent plastic-like product. The resins are soluble in various organic solvents such as the alcohols and, in the low molecular weight ketones such as acetone, in certain esters such as ethyl acetate, in various hydrocarbons such as benzene and toluene and most of the resins are soluble in drying oils of the hydrocarbon and the unsaturated fatty acid glyceride type.

It should be pointed out that the ketals of polyvinylalcohol are not readily formed by the direct reaction of the ketone and the alcohol; the present method, however, by the use of ketimines (herein included within the class of Schiff bases) permits the preparation of such products.

The following example is introduced for the purpose of illustrating the process and product of the present invention. In thus illustrating a typical procedure, it is not intended to limit or define the scope of the invention in any of its broad aspects in strict accordance thereto.

Polyvinyl acetate having a viscosity of 15 centipoises at 20° C. in benzene solution (8.6 g. per 100 ml.; i. e. a 1 molar solution based on the monomer) was hydrolyzed by refluxing in a dilute aqueous alcoholic solution of sodium hydroxide until the product, as shown by the acetyl number thereof, contained only 4.5% of its original acetyl content. The product of hydrolysis was washed and added to anhydrous methanol to which an equivalent amount of a Schiff base prepared by the reaction of butyraldehyde and aniline was added. Concentrated sulfuric acid was slowly run into the solution until an acid reaction was obtained. The mixture was thereupon heated for 3 hours at 50° C. following which water was added to precipitate the dissolved resin and remove amine salts by dissolution. The precipitated resin was filter dried and then further dried in a vacuum desiccator. The product was a polyvinyl butyal resin containing 9.0% free hydroxyl groups. It was thermoplastic and could be readily molded at 300° F. and 1500 p. s. i. pressure.

I claim as my invention:

1. A process for the production of a polyvinyl acetal type of resinous condensation product which comprises reacting at condensation reaction conditions a plurality of reactants consisting essentially of (1) a partially hydrolyzed polyvinyl alcohol ester homopolymer and (2) an N-substituted imine resulting from the condensation of a primary amine with a carbonyl compound selected from the group consisting of aldehydes and ketones.

2. The process of claim 1 further characterized in that said reactants are reacted in the presence of an acidic condensation catalyst.

3. The process of claim 1 further characterized in that said reactants are reacted in the presence of a strong mineral acid.

4. The process of claim 1 further characterized in that said reactants are reacted in the presence of an organic solvent for at least one of the reactants.

5. The process of claim 1 further characterized in that said reactants are reacted in the presence of an alcohol solvent.

6. The process of claim 1 further characterized in that said reactants are reacted at a temperature of from about 10° C. to about 150° C. and at sufficient pressure to maintain the reactants substantially in liquid phase.

7. The process of claim 1 further characterized in that said reactant (1) is hydrolyzed polyvinyl acetate and said reactant (2) is the condensation product of butyraldehyde and aniline.

8. The process of claim 7 further characterized in that said reactants are reacted in the presence of sulfuric acid and methanol.

9. The process of claim 1 further characterized in that said reactant (1) is a partial ester at least 95% hydrolyzed.

HERMAN S. BLOCH.

REFERENCES CITED

The following references are of record in the file of this patent:

UNITED STATES PATENTS

| Number | Name | Date |
|---|---|---|
| 1,659,152 | North | Feb. 4, 1928 |
| 2,227,975 | Kenyon | Jan. 7, 1941 |
| 2,363,297 | D'Alelio | Nov. 21, 1944 |
| 2,396,556 | Cox | Mar. 12, 1946 |
| 2,416,182 | Kistler | Feb. 18, 1947 |
| 2,433,098 | Bebacher | Dec. 23, 1947 |

FOREIGN PATENTS

| Number | Country | Date |
|---|---|---|
| 119,613 | Australia | Mar. 8, 1945 |
| 361,910 | Great Britain | Nov. 16, 1931 |
| 542,286 | Germany | Jan. 22, 1932 |